US008483299B2

(12) United States Patent
Nakayama

(10) Patent No.: US 8,483,299 B2
(45) Date of Patent: Jul. 9, 2013

(54) WIRELESS COMMUNICATION SYSTEM, WIRELESS COMMUNICATION APPARATUS AND WIRELESS COMMUNICATION METHOD

(75) Inventor: Taku Nakayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 242 days.

(21) Appl. No.: 12/865,386

(22) PCT Filed: Jan. 22, 2009

(86) PCT No.: PCT/JP2009/050996
§ 371 (c)(1),
(2), (4) Date: Jul. 29, 2010

(87) PCT Pub. No.: WO2009/096316
PCT Pub. Date: Aug. 6, 2009

(65) Prior Publication Data
US 2010/0329375 A1 Dec. 30, 2010

(30) Foreign Application Priority Data

Jan. 30, 2008 (JP) ................................ 2008-019848

(51) Int. Cl.
H04K 1/10 (2006.01)
(52) U.S. Cl.
USPC .......................................... 375/260; 375/267
(58) Field of Classification Search
USPC .................... 375/260, 267, 299, 347
See application file for complete search history.

(56) References Cited

U.S. PATENT DOCUMENTS 7,929,633 B2 * 4/2011 Seo et al. ....................... 375/267
2003/0185309 A1 10/2003 Pautler et al.
2010/0166100 A1 * 7/2010 Medvedev et al. ............ 375/267

FOREIGN PATENT DOCUMENTS

| JP | 4-237226 | 8/1992 |
| JP | 10-145283 | 5/1998 |
| JP | 2005-509316 | 4/2005 |
| JP | 2005-252834 | 9/2005 |
| JP | 2006-005791 | 1/2006 |
| JP | 2007-036403 | 2/2007 |
| JP | 2007-116414 | 5/2007 |

OTHER PUBLICATIONS

Korean Office Action for Korean Patent Application No. 10-2010-7017191, issued Jul. 29, 2011, 4 pages (including English translation).

(Continued)

Primary Examiner — Leon-Viet Nguyen
(74) Attorney, Agent, or Firm — Duane Morris LLP

(57) ABSTRACT

A channel estimation unit 18 estimates characteristics of a channel (channel estimation) based on signals received by a plurality of antennas. An SVD unit 19 performs singular value decomposition on each channel estimation value. An orthogonality determination unit 20 determines (recognizes) whether orthogonality of a plurality of eigenpaths is maintained or collapsed based on information indicating quality of a channel between a transmission apparatus and a reception apparatus. A reception scheme estimation unit 22 estimates a reception scheme to separate eigenpaths of a reception unit 2 based on information indicating quality of a channel in each eigenpath. A transmission adaptive control unit 23 performs predetermined control of a transmission apparatus 1 at transmission based on the reception scheme of the reception apparatus estimated by the reception scheme estimation unit 22 and a result of determination (recognition) by the orthogonality determination unit 20.

8 Claims, 9 Drawing Sheets

OTHER PUBLICATIONS

Notification of Reason(s) for Refusal (including translation) for JP 046,090/2008, mailed May 15, 2012, 4 pages.
International Search Report for PCT/JP2009/050996, mailed on Apr. 21, 2009, 2 pages.
Mizutani et al., The Institute of Electronics, Information and Communication Engineers Society Taikai Koen Ronbunshu (2005) p. 247.
Office Action dated Jan. 14, 2013 from corresponding Chinese patent application No. 200980103483.5.

* cited by examiner

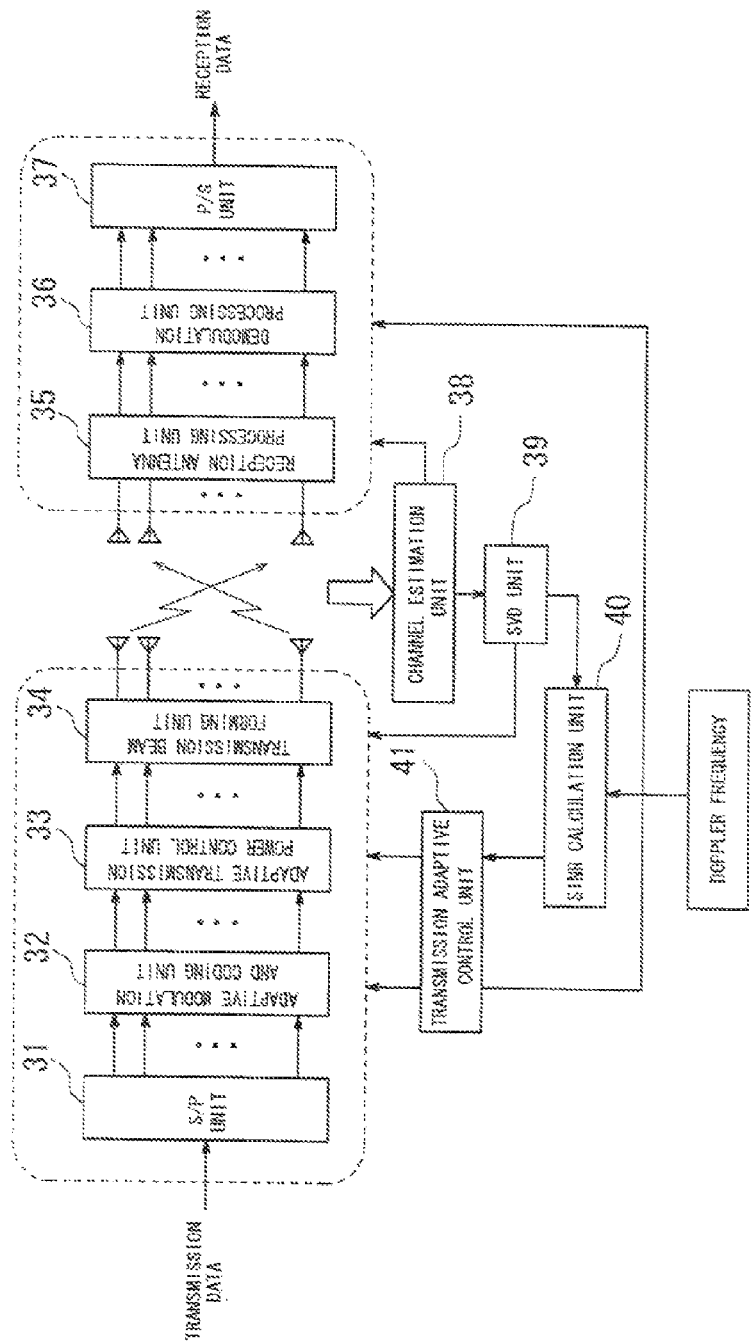

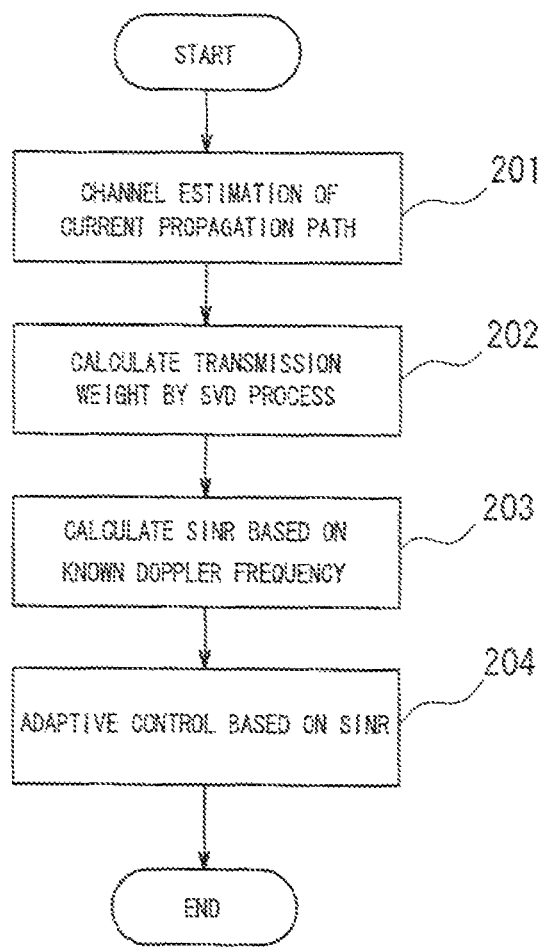
(Prior Art)

WIRELESS COMMUNICATION SYSTEM, WIRELESS COMMUNICATION APPARATUS AND WIRELESS COMMUNICATION METHOD

CROSS REFERENCE TO RELATED APPLICATIONS

This application is a U.S. National Phase of International Application No. PCT/JP2009/050996 (filed on Jan. 22, 2009), which claims priority to and the benefit of Japanese Patent Application No. 2008-19848 (filed on Jan. 30, 2008), the entire contents of these applications are incorporated herein by reference.

TECHNICAL FIELD

The present invention relates to wireless communication systems, wireless communication apparatus and wireless communication methods using MIMO communication.

BACKGROUND ART

In recent years, in order to increase the transmission capacity of an overall system, a method of evaluating reception quality and adaptively allocating resources based on the reception quality has been popularly used in a communication system. In particular, MIMO (Multiple Input Multiple Output) communication which uses a plurality of antennas for transmission and reception is known to be able to dramatically increase the transmission capacity of the system, when using an independent channel called an eigenpath by SVD (Singular Value Decomposition) scheme, by controlling transmission power and a modulation scheme of each path based on an eigenvalue of the eigenpath.

A scheme based on water filling principle is considered as the most suitable scheme of adaptive control of the MIMO communication, and methods to increase the transmission capacity of the system with an actual discrete modulation method have been actively studied. In addition, since a path with the smallest eigenvalue has low cost performance of transmission, a method to simply control without using the path at all has been considered.

However, a control scheme of the MIMO communication using such an eigenpath is known as being very sensitive and transmission characteristics are thus dramatically deteriorated if orthogonality is collapsed for some reason. In order to address such a problem, it is suggested to prevent the characteristic deterioration when orthogonality is collapsed, with a Doppler frequency and the likes as known information, by calculating SINR (Signal to Interference plus Noise Ratio) based on the information and performing control (see Patent Document 1).

FIG. 8 is a diagram illustrating a basic configuration of a conventional wireless communication system which performs adaptive control based on SINR. FIG. 9 is a flow chart illustrating an operation. A transmission apparatus 1 is provided with an S/P unit 31, an adaptive modulation and coding unit 32, an adaptive transmission power control unit 33 and a transmission beam forming unit 34, whereas a reception apparatus 2 is provided with a reception antenna processing unit 35, a demodulation processing unit 36, and a P/S unit 37. A channel estimation unit 38, an SVD unit 39, an SINR calculation unit 40 and a transmission adaptive control unit 41 may be provided to either the transmission apparatus 1 or the reception apparatus 2.

The channel estimation unit 38 performs channel estimation of a current propagation path (step 201), and the SVD unit 39 calculates a transmission weight by an SVD process from a channel estimation value (step 202). The SINR calculation unit 40 calculates SINR based on the known information of the Doppler frequency (step 203), and then the transmission adaptive control unit 41 performs adaptive control based on SINR (step 204).

Patent Document 1: Japanese Patent Application Laid-Open No. 2005-252834

DISCLOSURE OF THE INVENTION

Problems to be Solved by the Invention

As stated above, when the adaptive control is performed in the MIMO communication using the eigenpath (hereinafter, referred to as SVD-MIMO), collapse of orthogonality because of variation of the channel is a major cause of the characteristic deterioration. A method to perform optimum adaptive control in the SVD-MIMO communication when orthogonality is collapsed as stated above may lose the transmission capacity of the overall system, in fact.

In addition, although Patent Document 1 assumes the Doppler frequency as known, it is generally difficult to estimate the Doppler frequency. It is thus preferred to be able to determine in a simple manner whether orthogonality is collapsed and, at the same time, to know a reception processing method in a simple manner.

In order to address such problems, it is an object of the present invention to provide wireless communication systems, wireless communication apparatus and wireless communication methods capable of determining whether adaptive control may function in the SVD-MIMO communication without directly measuring the Doppler frequency.

SUMMARY OF THE INVENTION

In order to achieve the above object, the present invention is characterized in that a wireless communication system for performing wireless communication via a plurality of eigenpaths between a transmission apparatus and a reception apparatus includes: a determination unit for determining whether orthogonality of the plurality of eigenpaths is maintained or collapsed based on information indicating quality of a channel between the transmission apparatus and the reception apparatus; and a control unit for performing predetermined control of the transmission apparatus at transmission based on a result of determination by the determination unit.

In addition, the present invention is characterized in that a wireless communication system for performing wireless communication via a plurality of eigenpaths between a transmission apparatus and a reception apparatus includes: an estimation unit for estimating a reception scheme of the reception apparatus based on information indicating quality of a channel of each of the eigenpaths; a determination unit for determining whether orthogonality of the plurality of eigenpaths is maintained or collapsed based on information indicating quality of a channel between the transmission apparatus and the reception apparatus; and a control unit for performing predetermined control of the transmission apparatus at transmission based on the reception scheme of the reception apparatus estimated by the estimation unit and a result of determination by the determination unit.

It is preferred that the control unit performs the predetermined control of the transmission apparatus according to a first control scheme based on the water filling principle if the orthogonality is maintained as a result of determination by the determination unit, or performs the predetermined control according to a second control scheme different from the first control scheme if the orthogonality is collapsed. The second control scheme is to change a ratio of control based on the water filling principle to non-control, based on a collapsing degree of the orthogonality and the reception scheme of the reception apparatus.

In addition, it is preferred that the reception apparatus is provided with a channel estimation unit for estimating characteristic of the channel as the information indicating the quality of the channel based on a reception signal, and that the determination unit determines whether the orthogonality is maintained or collapsed based on information indicating the characteristic of the channel estimated by the channel estimation unit and information indicating the characteristic of the channel transmitted from the reception apparatus to the transmission apparatus.

It is also preferred that the predetermined control of the transmission apparatus at transmission is at least power control at transmission or modulation and coding control.

The present invention is characterized in that a wireless communication apparatus for performing wireless communication via a plurality of eigenpaths includes: a recognition unit for recognizing whether orthogonality of the plurality of eigenpaths is maintained or collapsed, based on information indicating quality of a channel; and a control unit for performing predetermined control at transmission based on a result of recognition by the recognition unit.

In addition, the present invention is characterized in that a wireless communication apparatus for performing wireless communication via a plurality of eigenpaths includes: an estimation unit for estimating a reception scheme of a counterpart wireless communication apparatus based on information indicating quality of a channel of each of the eigenpaths; a recognition unit for recognizing whether orthogonality of the plurality of eigenpaths is maintained or collapsed based on the information indicating the quality of the channel; and a control unit for performing predetermined control at transmission based on the reception scheme of the counterpart wireless communication apparatus estimated by the estimation unit and a result of recognition by the recognition unit.

Moreover, the present invention is characterized in that a wireless communication method of a wireless communication system for performing wireless communication via a plurality of eigenpaths between a transmission apparatus and a reception apparatus, includes the steps of: determining whether orthogonality of the plurality of eigenpaths is maintained or collapsed based on information indicating quality of a channel between the transmission apparatus and the reception apparatus; and performing predetermined control of the transmission apparatus at transmission based on a result of determination.

Furthermore, the present invention is characterized in that a wireless communication method of a wireless communication system for performing wireless communication via a plurality of eigenpaths between a transmission apparatus and a reception apparatus, includes the steps of: estimating a reception scheme of the reception apparatus based on information indicating quality of a channel of each of the eigenpaths; determining whether orthogonality of the plurality of eigenpaths is maintained or collapsed based on information indicating quality of a channel between the transmission apparatus and the reception apparatus; and performing predetermined control of the transmission apparatus at transmission based on the estimated reception scheme of the reception apparatus and a result of the determination.

EFFECT OF THE INVENTION

According to the present invention, it is possible to execute adaptive control efficiently in SVD-MIMO communication without directly measuring Doppler frequency. Moreover, even if the adaptive control of only SVD-MIMO communication fails to effectively function, it is possible to control so as to effectively use the transmission capacity of a system in a coordinated manner with a reception side by considering the reception scheme to separate reception signals at the reception side, in comparison with a conventional method.

BRIEF DESCRIPTION OF DRAWINGS

FIG. 8 is diagram illustrating a basic configuration of a conventional wireless communication system which performs adaptive control based on SINR; and FIG. 9 is a flow chart illustrating an operation of the conventional wireless communication system.

DESCRIPTION OF EMBODIMENTS

A preferred embodiment of the present invention will be described with reference to the accompanying drawings. First, SVD-MIMO communication as a basis of the present invention is described. In the SVD-MIMO communication, transmission and reception weights are obtained based on the following formula:

$$\hat{H} = U\Sigma V^H \quad \text{[Formula 1]}$$

However, $\hat{H}$: Channel estimation value $$\Sigma = \text{diag}[\sqrt{\lambda_1}, \ldots, \sqrt{\lambda_m}] \; \lambda_i: \text{Eigenvalue of i-th path, m: the number of paths} \quad \text{[Formula 2]}$$

At this time, if transmission and reception weights are respectively expressed as:

$$V, U^H, \quad \text{[Formula 3]}$$

since $$V, U^H \quad \text{[Formula 4]}$$

satisfy unitarity, a relationship between a reception signal y and a transmission signal x is shown as follows:

$$y = U^H H V x = U^H U \Sigma V^H V x = \Sigma x \quad \text{[Formula 5]}$$

Accordingly, if a predicted channel $$\hat{H} \quad \text{[Formula 6]}$$

and a channel $$H \quad \text{[Formula 7]}$$

which is actually used for transmission are equal to each other, it is found that the transmission signal may be independently received based on the eigenvalue of each path. However, noise is not considered in this case.

A conventional adaptive control of the SVD-MIMO communication allocates a large amount of data or transmission power to a path with a large eigenvalue while allocating a small amount of data or allocating no power to a path with a small eigenvalue, so as to achieve highly effective data transmission based on the water filling principle.

However, in the SVD-MIMO communication, if the predicted channel $$\hat{H} \quad \text{[Formula 8]}$$

and the channel $$H \quad \text{[Formula 9]}$$

which is actually used for transmission are different from each other, orthogonality between eigenpaths is collapsed, leading to increase in interference between the paths and thereby the BER (Bit Error Rate) characteristic is seriously deteriorated if only an SVD process is performed at a reception side.

Figure 1:
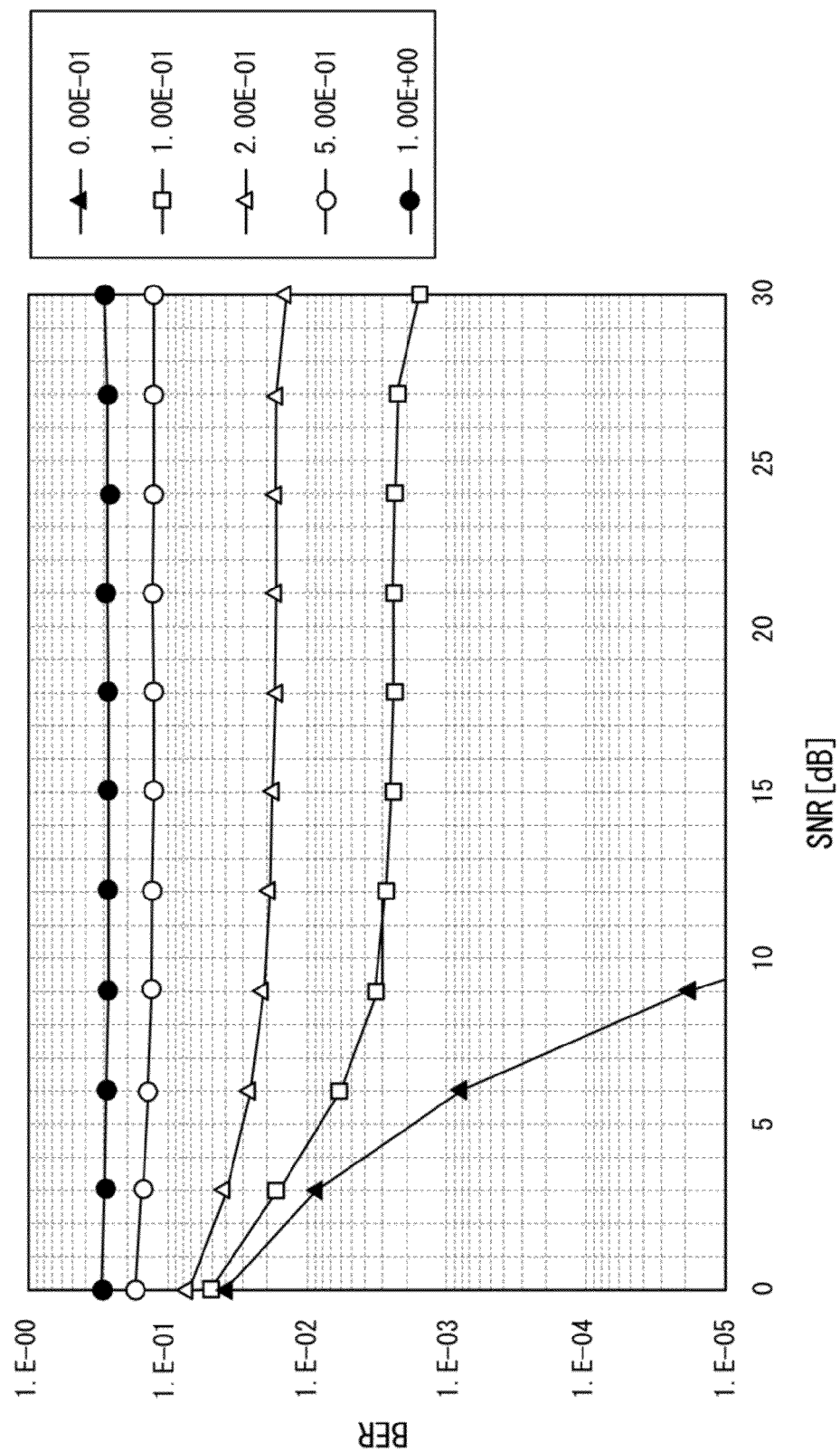
FIG. 1 is a diagram illustrating an example of deterioration of the BER characteristic when orthogonality is collapsed.

FIG. 1 is a diagram illustrating an example of deterioration of BER characteristic when orthogonality is collapsed and shows BER to SNR (Signal to Noise Ratio) when differences between predicted time and transmission time are 0 msec, 0.1 msec, 0.2 msec, 0.5 msec, and 1 msec in transmission of 8 bit data with 4 transmission antennas, 4 reception antennas and 4 eigenpaths at maximum. It is shown that the characteristic is deteriorated when a delay time is not 0 msec.

In addition, as stated above, it is known that, if the predicted channel $$\hat{H} \quad \text{[Formula 10]}$$

is different from the actual channel $$H, \quad \text{[Formula 11]}$$

the characteristics of the paths become similar to each other if weighting is performed at the transmission side and a MIMO process is performed at the reception side.

If the adaptive control is performed even in such a condition assuming that the SVD-MIMO communication system is perfect, it results in a loss of system capacity since data may be allocated to an eigenpath which is already unusable and may not be allocated to an eigenpath which can be used.

Accordingly, if collapse of orthogonality is recognized by some method, it is preferred to control based on an algorithm different from one used when the SVD-MIMO communication system operates perfectly.

Detection of collapse of orthogonality may be performed at one of the transmission side and the reception side. When a processing ability of the reception side is low, the transmission side detects collapse of orthogonality by using feedback information and the likes. If the reception side has sufficient processing ability and it is not desired to add unnecessary feedback information, the reception side may detect collapse of orthogonality and send only a result of detection to the transmission side.

For example, it is assumed that, when the transmission side detects collapse of orthogonality, SNR of each path by the SVD process at transmission and SNR of each path of reception side at reception obtained from the feedback information and the likes are obtained. At this time, if they are well matched with each other, it is considered that there is almost no difference in the predicted channel $$\hat{H} \quad \text{[Formula 12]}$$

and the channel at transmission $$H \quad \text{[Formula 13]}$$

and that orthogonality is maintained. However, when there is a difference between them, especially if SNR of a higher eigenpath with a large eigenvalue decreases at reception while SNR of a lower eigenpath with a small eigenvalue increases, it may be determined that orthogonality is collapsed.

It is preferred, based on information of such, not to perform adaptive control strictly in accordance with the water filling principle but to perform correction and control so as to be able to effectively use the system capacity even if orthogonality is collapsed.

In addition, when a high-level reception scheme such as MLD (Maximum Likelihood Detection) is used to separate the eigenpaths at the reception side, effect of the adaptive control may be easily maintained even if orthogonality of the eigenmode is collapsed, since it is highly capable of maintaining the BER characteristic in comparison with a simple reception scheme such as MMSE (Minimum Mean Square Error).

Figure 2:
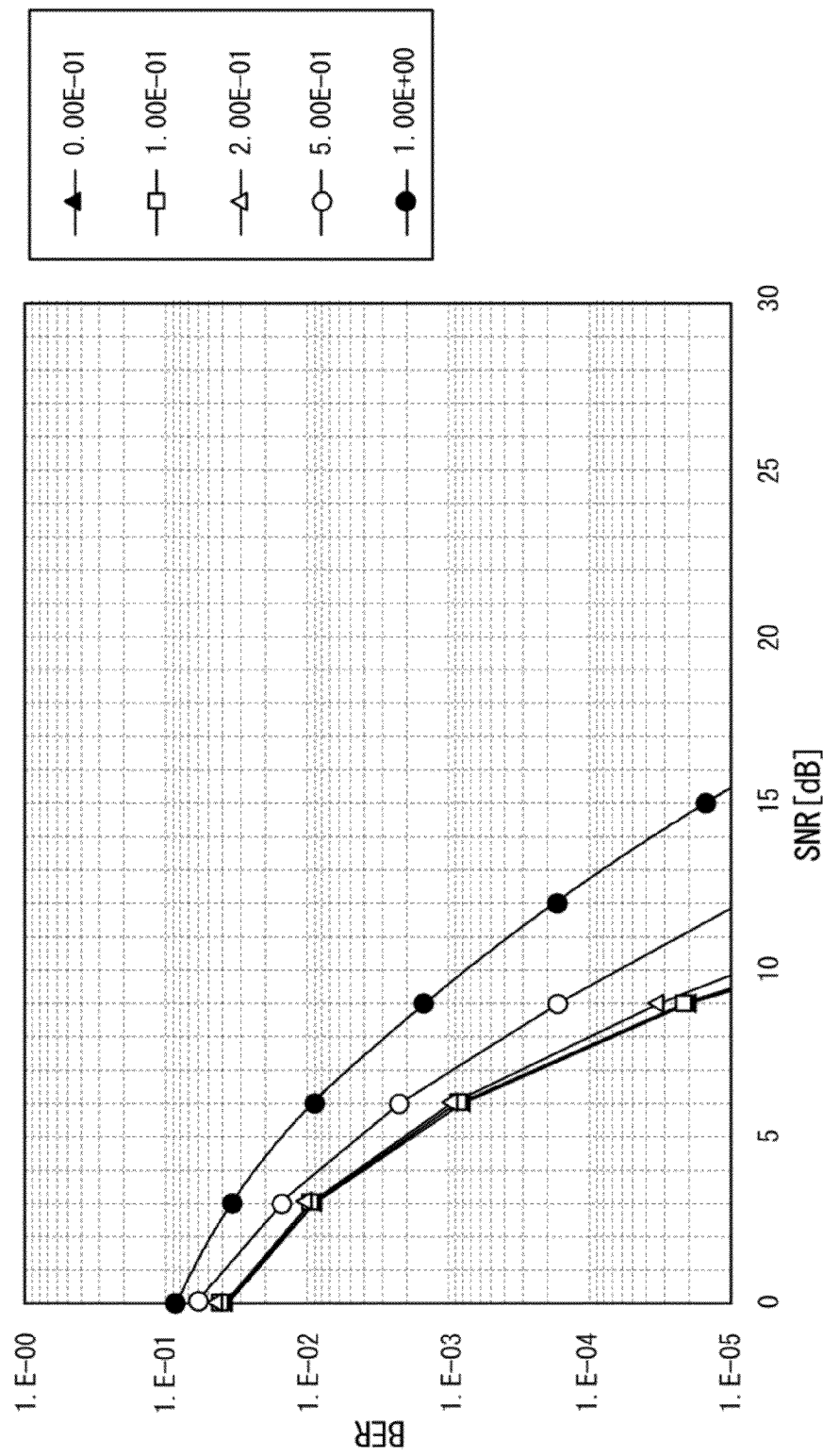
FIG. 2 is a diagram illustrating an example of deterioration of the BER characteristic when a reception scheme of MLD is used to separate eigenpaths.
Figure 3:
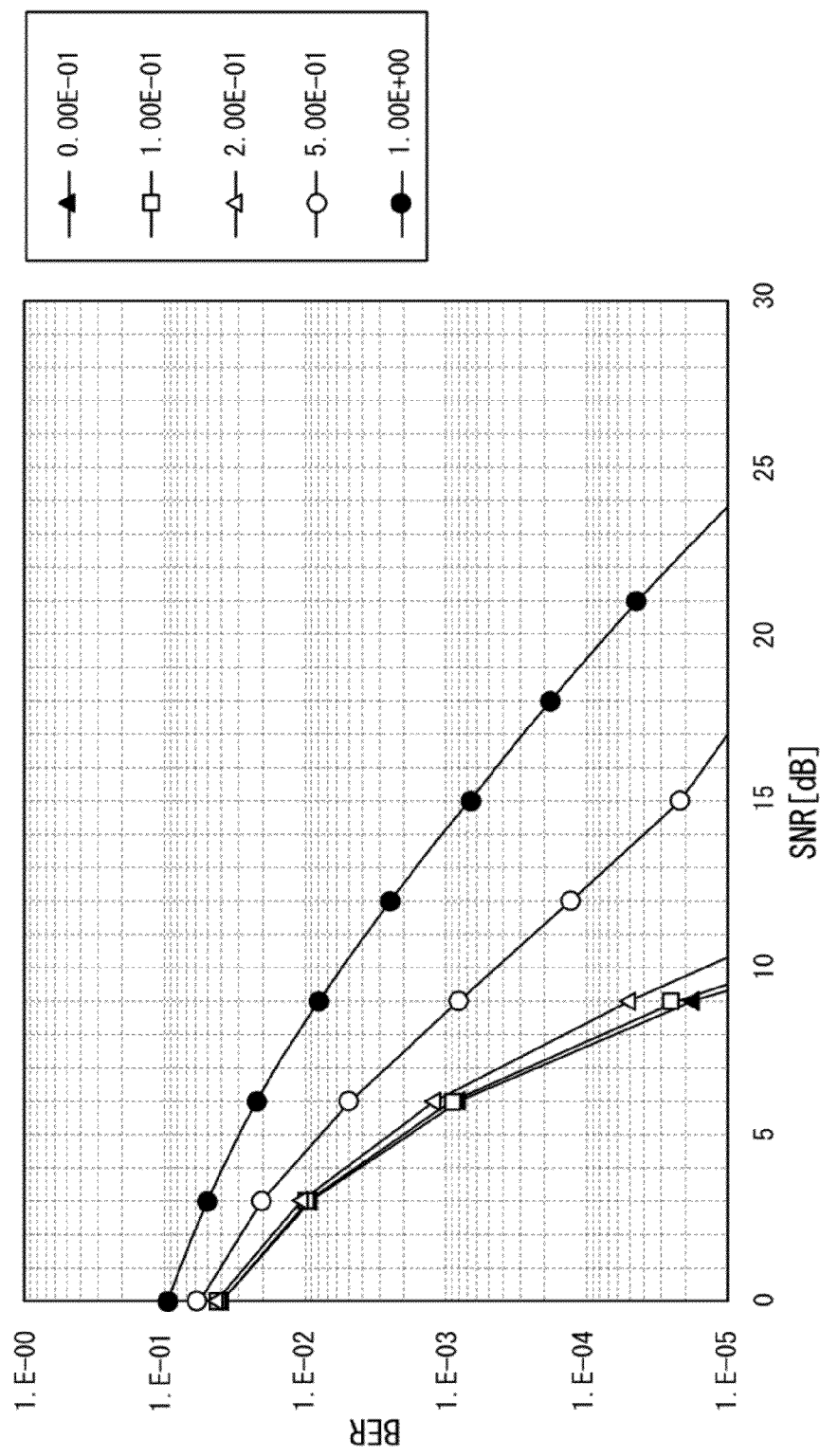
FIG. 3 is a diagram illustrating an example of deterioration of the BER characteristic when a reception scheme of MMSE is used to separate eigenpaths.

FIG. 2 is a diagram illustrating an example of deterioration of the BER characteristic when MLD is used as the reception scheme to separate the eigenpaths, whereas FIG. 3 is a diagram illustrating an example of deterioration of the BER characteristic when MMSE is used as the reception scheme to separate the eigenpaths. FIG. 2 and FIG. 3 show BER to SNR when differences between the predicted time and the transmission time are 0 msec, 0.1 msec, 0.2 msec, 0.5 msec, and 1 msec in transmission of 8 bit data in total for a symbol with 4 transmission antennas, 4 reception antennas and 4 eigenpaths at maximum. It is shown in FIG. 2 and FIG. 3 that it is highly capable of maintaining the BER performance when MLD is used as the reception scheme to separate the eigenpaths.

Accordingly, it is considered that, if the reception scheme is found out, it is possible to use the system capacity more efficiently by changing a criterion for determination whether to perform adaptive control in accordance with the reception scheme.

Figure 4:
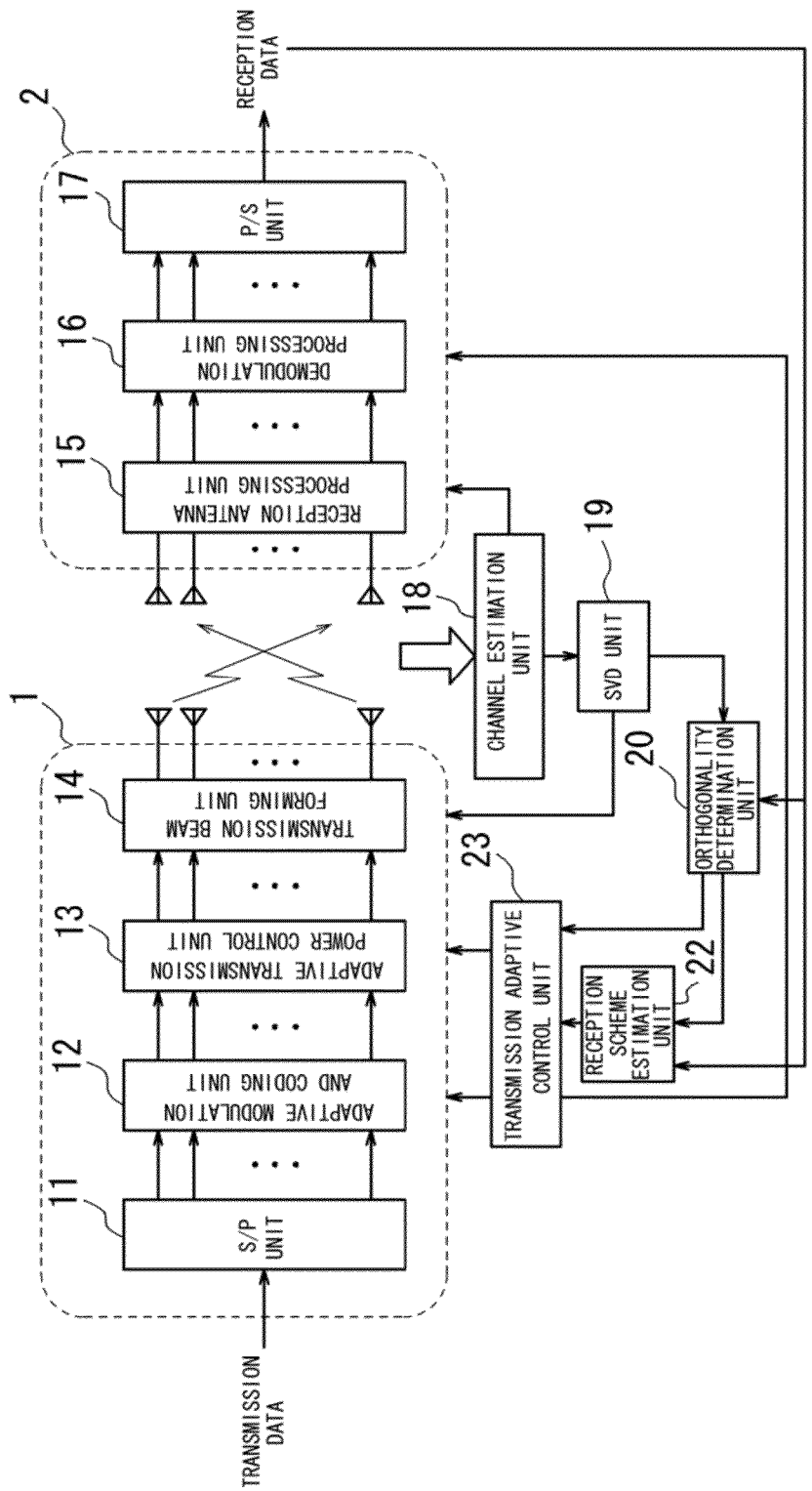
FIG. 4 is a diagram illustrating a basic configuration of a wireless communication system according to the present invention.

The present invention is described on the basis of the description stated above. FIG. 4 is a diagram of a basic configuration of the wireless communication system according to the present invention. As shown in FIG. 4, a transmission apparatus 1 has a plurality of transmission antennas and is provided with an S/P unit 11, an adaptive modulation and coding unit 12, an adaptive transmission power control unit 13, and a transmission beam forming unit 14. A reception unit 2 also has a plurality of antennas and is provided with a reception antenna processing unit 15, a demodulation processing unit 16, a P/S unit 17, and a channel estimation unit (channel estimation unit) 18. An SVD unit 19, an orthogonality determination unit (determination unit or recognition unit) 20, a reception scheme estimation unit (estimation unit) 22, and a transmission adaptive control unit (control unit) 23 may be provided to either the transmission apparatus 1 or the reception apparatus 2.

The S/P unit 11 performs serial parallel conversion on transmission data and outputs the transmission data for each eigenpath. The adaptive modulation and coding unit 12 modulates and encodes the transmission data of each eigenpath in accordance with output of the transmission adaptive control unit 23. The adaptive transmission power control unit 13 controls transmission power of a transmission signal of each eigenpath output from the adaptive modulation and coding unit 12, in accordance with the output from the transmission adaptive control unit 23. The transmission beam forming unit 14 forms a transmission eigenbeam by multiplying the transmission signal output from the adaptive transmission power control unit 13 by a transmission weight output from the SVD unit 19 and also multiplexes the signal for each transmission antenna.

A MIMO channel is formed between a plurality of transmission antennas and a plurality of reception antennas. The reception antenna processing unit 15 performs spatial filtering by calculating a reception weight based on a result of channel estimation output from the channel estimation unit 18, or extracts the signal of each eigenpath by performing a maximum likelihood reception process. The demodulation processing unit 16 performs error-correction demodulation and the likes on the signal of each eigenmode based on output information from the transmission adaptive control unit 23 so as to output the reception data. The P/S unit 17 performs parallel serial conversion on the reception data of each eigenmode.

Based on the signal received by a plurality of reception antennas, the channel estimation unit 18 estimates characteristics of the channel (channel estimation). The SVD (Singular Value Decomposition) unit 19 performs singular value decomposition on each channel estimation value. The orthogonality determination unit 20 determines (recognizes) whether orthogonality of the plurality of eigenpaths is maintained or collapsed based on information indicating quality of the channel between the transmission apparatus 1 and the reception apparatus 2. That is, the orthogonality determination unit 20 determines whether orthogonality is maintained or collapsed based on information indicating the characteristics of the channel estimated by the channel estimation unit 18 and information indicating the characteristics of the channel transmitted from the reception apparatus 2 to the transmission apparatus 1. The reception scheme estimation unit 22 estimates the reception scheme of the reception apparatus 2 to separate the eigenpaths based on information indicating quality of the channel (information indicating the characteristics of the channel) of each eigenpath. The transmission adaptive control unit 23 performs predetermined control (power control or modulation and coding control) of the transmission apparatus 1 at transmission based on the reception scheme of the reception apparatus estimated by the reception scheme estimation unit 22 and a result of determination (result of recognition) by the orthogonality determination unit 20.

Figure 5:
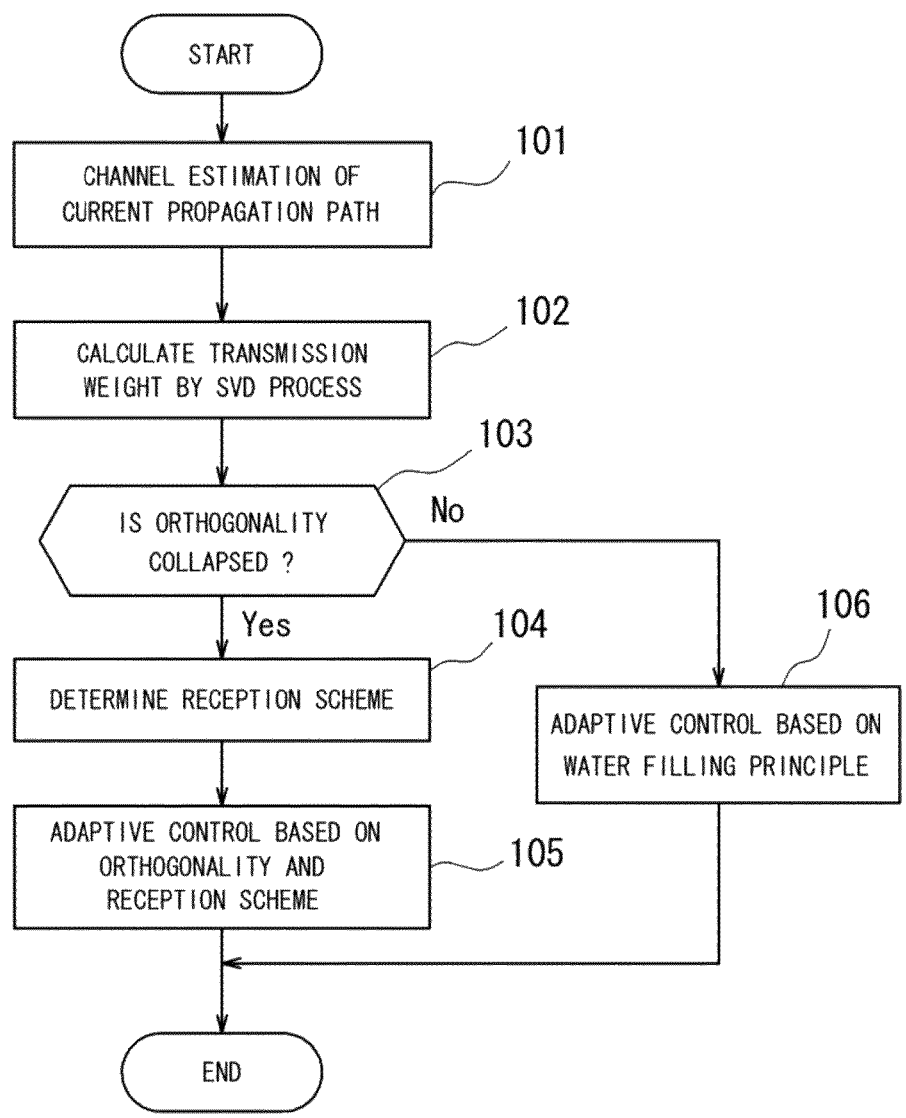
FIG. 5 is a flowchart illustrating an operation of the present invention.

Next, an operation of the present invention is described based on a flowchart shown in FIG. 5. The channel estimation unit 18 performs channel estimation of a current propagation path (step 101), and then the SVD unit 19 calculates the transmission weight from the channel estimation value by the SVD process (step 102). The orthogonality determination unit 20 determines (recognizes) whether orthogonality is collapsed based on channel information from the channel estimation unit 18 and information indicating the eigenvalue fed back from the reception apparatus (step 103). If orthogonality is not collapsed (No), the transmission adaptive control unit 23 performs adaptive control (first control scheme) based on the water filling principle (step 106). If orthogonality is collapsed at step 103 (Yes), the reception scheme estimation unit 22 estimates the reception scheme to separate the eigenpaths (step 104), and the transmission adaptive control unit 23 performs adaptive control (second control scheme) based on the orthogonality and the reception scheme (step 105).

Here, although whether orthogonality of the eigenpath is collapsed may be determined either at the transmission side or at the reception side, if orthogonality is determined at the transmission side from feedback information such as SNR (Signal to Noise Ratio) essential to FDD (Frequency Division Duplex) system and the eigenvalue, it is possible to reduce unnecessary feedback overhead. In addition, since there is no need for the reception side to determine orthogonality if orthogonality is determined at the transmission side, it is also possible to design to switch depending on the processing ability of a terminal.

Similarly, if the transmission side has no system in protocol to know the reception scheme, it is possible to reduce overhead by estimating from any feedback information.

Figure 6:
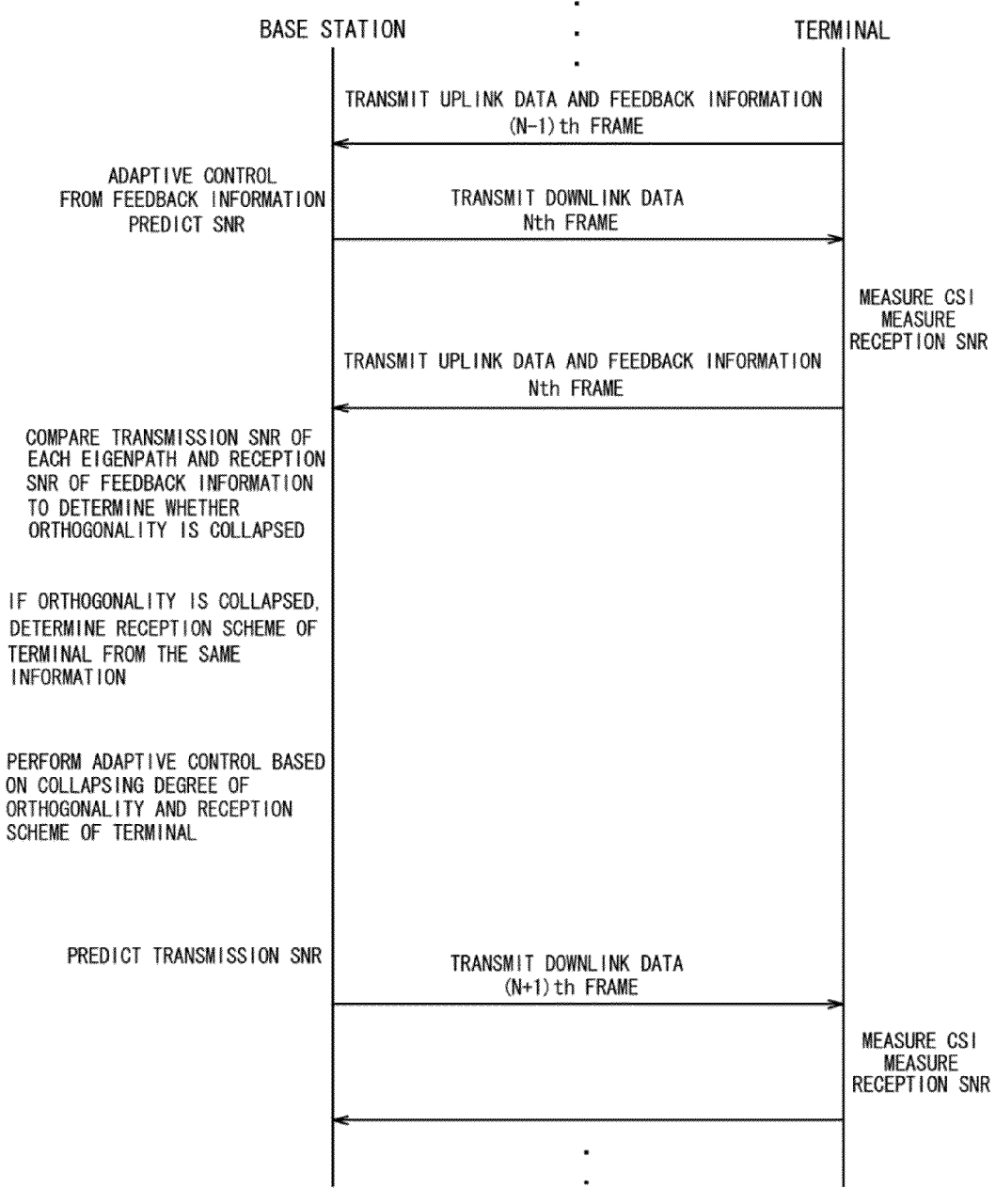
FIG. 6 is a sequence diagram illustrating an operation by a base station to perform a determination processing and adaptive control.

Next, the operation of the present invention is described based on the embodiment. FIG. 6 is a sequence diagram illustrating an operation when a base station, which is the transmission apparatus, performs all determination from the feedback information from a terminal, which is the reception apparatus, and performs adaptive control.

When the base station receives UpLink data and the feedback information such as CSI (Channel State Information), for example, by an (N−1)th frame from the terminal, the base station transmits DownLink data by an N-th frame to the terminal by performing adaptive control using the feedback information and predicts SNR. When receiving the DownLink data, the terminal measures reception SNR and CSI, and feeds back the UpLink data and feedback information by the N-th frame to the base station. The base station perform calculation based on a previous CSI and compares a predicted transmission SNR and SNR fed back for each eigenpath and, if a result of comparison matches, recognizes that orthogonality is not collapsed and performs adaptive control based on ideal SVD-MIMO communication and the water filling principle.

However, if SNR predicted by the base station does not match with SNR fed back from the terminal, the base station determines that orthogonality is collapsed and performs the following process.

If the base station does not know the reception scheme of the terminal, the reception scheme is estimated from variation inclinations of SNR characteristics of a higher eigenpath with a large eigenvalue and a lower eigenpath with a small eigenvalue. The reception scheme may be estimated by such a method, since there is a case that SNR of the higher eigenpath decreases and SNR of the lower eigenpath increases if the reception scheme is a high-performance one such as MLD.

A ratio of control based on the water filling principle to no-control is changed as shown by the following formula, in accordance with a collapsing degree of orthogonality and estimated reception scheme of the terminal, so as to perform a concerted adaptive control to make the best use of system capacities of the base station and the terminal.

$$\alpha(\beta,\gamma)\text{WaterFillingControl} + (1-\alpha(\beta,\gamma))\text{NonControl} \quad \text{[Formula 14]}$$

where $0 \leq \alpha(\beta,\gamma) \leq 1$: no-control if 0, and control based on complete water filling principle if 1

$\beta$: collapsing degree of orthogonality (as collapsing degree is larger, $\alpha$ tends to be smaller)

$\gamma$: a variable based on reception scheme (as reception scheme is of higher-performance, $\alpha$ tends to be smaller)

The collapsing degree of orthogonality β is determined as follows:

if all non-diagonal components of [Formula 15]

$$U^H HV = \sum_{Rx} = \begin{bmatrix} d_{11} & \sigma_{1,2} & \cdots & \sigma_{1,N} \\ \sigma_{2,1} & d_{22} & \ddots & \vdots \\ \vdots & \ddots & \ddots & \sigma_{N-1,N} \\ \sigma_{N,1} & \cdots & \sigma_{N,N-1} & d_{NN} \end{bmatrix}$$

are 0, that is, if $\sigma_{1,2} = \sigma_{2,1} = \ldots = \sigma_{N-1,N} = \sigma_{N,N-1} = 0$ is not satisfied, it is defined as:

$$S_{POW} = \sum_{i=1}^{N} d_i \quad \text{[Formula 16]}$$

$$I_{POW} = \sum_{i \neq j} \sigma_{i,j}$$

and the collapsing degree of orthogonality is determined based on the formula 17.

$$\frac{S_{POW}}{I_{POW}} \quad \text{[Formula 17]}$$

Orthogonality is maintained if $$\frac{S_{POW}}{I_{POW}} \quad \text{[Formula 18]}$$

is large, whereas there is almost no orthogonality if it is close to 1.

It is to be noted that it may be also possible not to perform adaptive control considering that $\alpha(\beta,\gamma)=0$ is satisfied, if $\sigma_{1,2} = \sigma_{2,1} = \ldots = \sigma_{N-1,N} = \sigma_{N,N-1} = 0$ is not satisfied.

Subsequently, the base station transmits the DownLink data by an (N+1)th frame to the terminal and predicts SNR.

In Formula 14, if orthogonality is dramatically collapsed eventually and the channel at transmission and the channel at reception are regarded as uncorrelated, no control is performed on any path in each reception process, it is thereby possible to obtain at least characteristics depending on MIMO processing at reception.

Although orthogonality is determined and the reception scheme is estimated based on difference between transmission SNR and reception SNR in the above embodiment, it may be also possible to determine orthogonality and to estimate the reception scheme by other information such as a dispersion of eigenvalues of each eigenpath, for example.

In addition, although the base station performs overall determination using the feedback information in the above embodiment, this process may be performed by the terminal. In such a case, although the terminal is loaded with computation, it may decrease the feedback information, thus increasing the system capacity. Moreover, since the reception scheme is known obviously, it is possible to perform adaptive control more accurately.

Figure 7:
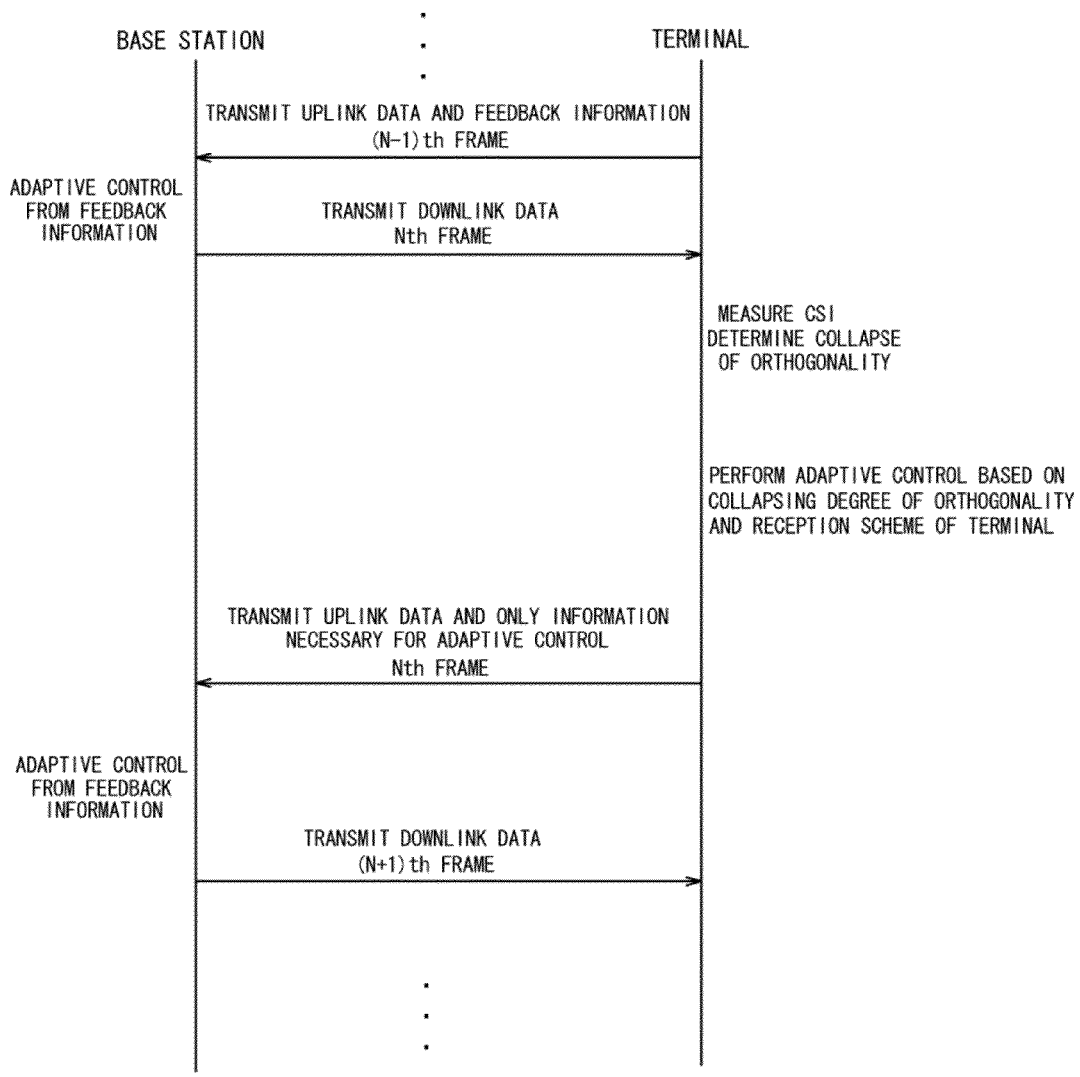
FIG. 7 is a sequence diagram illustrating an operation by a terminal to perform the determination processing.

FIG. 7 is a sequence diagram illustrating an operation of the terminal, which is the reception apparatus, to perform a determination process.

The terminal transmits the UpLink data and feedback information such as CSI, for example, to the base station by the (N−1)th frame. When the base station performs adaptive control using the feedback information received and transmits the DownLink data to the terminal by the N-th frame, the terminal receives the DownLink data and measures CSI to determine whether orthogonality is collapsed. If orthogonality is not collapsed, the terminal performs adaptive control based on the ideal SVD-MIMO communication and the water filling principle. If orthogonality is collapsed, the terminal performs adaptive control based on the collapsing degree of orthogonality and the reception scheme of the terminal.

In addition, the terminal transmits the UpLink data and information necessary for adaptive control to the base station by the N-th frame. When the base station performs adaptive control using the information received and transmits the DownLink data to the terminal by the (N+1)th frame, the terminal receives the DownLink data.

The invention claimed is:

1. A wireless communication system for performing wireless communication via a plurality of eigenpaths between a transmission apparatus and a reception apparatus, comprising:
   a determination unit for determining whether orthogonality of the plurality of eigenpaths is maintained or collapsed based on information indicating quality of a channel between the transmission apparatus and the reception apparatus; and
   a control unit for performing predetermined control of the transmission apparatus at transmission based on a result of determination by the determination unit,
   wherein the control unit performs the predetermined control of the transmission apparatus according to a first control scheme based on water filling principle if the orthogonality is maintained as a result of determination by the determination unit, or performs the predetermined control according to a second control scheme different from the first control scheme if the orthogonality is collapsed, and
   wherein the second control scheme is to change a ratio of control based on the water filling principle to non-control, based on a collapsing degree of the orthogonality and the reception scheme of the reception apparatus.

2. A wireless communication system for performing wireless communication via a plurality of eigenpaths between a transmission apparatus and a reception apparatus, comprising:
   an estimation unit for estimating a reception scheme of the reception apparatus based on information indicating quality of a channel of each of the eigenpaths;
   a determination unit for determining whether orthogonality of the plurality of eigenpaths is maintained or collapsed based on information indicating quality of a channel between the transmission apparatus and the reception apparatus; and
   a control unit for performing predetermined control of the transmission apparatus at transmission based on the reception scheme of the reception apparatus estimated by the estimation unit and a result of determination by the determination unit,
   wherein the control unit performs the predetermined control of the transmission apparatus according to a first control scheme based on water filling principle if the orthogonality is maintained as a result of determination by the determination unit, or performs the predetermined control according to a second control scheme different from the first control scheme if the orthogonality is collapsed, and wherein the second control scheme is to change a ratio of control based on the water filling principle to non-control, based on a collapsing degree of the orthogonality and the reception scheme of the reception apparatus.

3. The wireless communication system according to claim 1, wherein the reception apparatus comprises a channel estimation unit for estimating characteristic of the channel as the information indicating the quality of the channel based on a reception signal, and the determination unit determines whether the orthogonality is maintained or collapsed based on information indicating the characteristic of the channel estimated by the channel estimation unit and information indicating the characteristic of the channel transmitted from the reception apparatus to the transmission apparatus.

4. The wireless communication system according to claim 1, wherein the predetermined control of the transmission apparatus at transmission is at least power control at transmission or modulation and coding control.

5. A wireless communication apparatus for performing wireless communication via a plurality of eigenpaths, comprising:

a recognition unit for recognizing whether orthogonality of the plurality of eigenpaths is maintained or collapsed based on information indicating quality of a channel; and a control unit for performing predetermined control at transmission based on a result of recognition by the recognition unit, wherein the control unit performs the predetermined control of the communication apparatus according to a first control scheme based on water filling principle if the orthogonality is maintained as a result of a determination whether orthogonality of the plurality of eigenpaths is maintained or collapsed based on information indicating a quality of a channel between the communication apparatus and a reception apparatus, or performs the predetermined control according to a second control scheme different from the first control scheme if the orthogonality is collapsed, and wherein the second control scheme is to change a ratio of control based on the water filling principle to non-control, based on a collapsing degree of the orthogonality and the reception scheme of the reception apparatus.

6. A wireless communication apparatus for performing wireless communication via a plurality of eigenpaths, comprising:

an estimation unit for estimating a reception scheme of a counterpart wireless communication apparatus based on information indicating quality of a channel of each of the eigenpaths;

a recognition unit for recognizing whether orthogonality of the plurality of eigenpaths is maintained or collapsed based on the information indicating the quality of the channel; and a control unit for performing predetermined control at transmission based on the reception scheme of the counterpart wireless communication apparatus estimated by the estimation unit and a result of recognition by the recognition unit, wherein the control unit performs the predetermined control of the transmission apparatus according to a first control scheme based on water filling principle if the orthogonality is maintained as a result of recognizing by the recognition unit, or performs the predetermined control according to a second control scheme different from the first control scheme if the orthogonality is collapsed, and wherein the second control scheme is to change a ratio of control based on the water filling principle to non-control, based on a collapsing degree of the orthogonality and the reception scheme of the reception apparatus.

7. A wireless communication method of a wireless communication system for performing wireless communication via a plurality of eigenpaths between a transmission apparatus and a reception apparatus, comprising the steps of:

determining whether orthogonality of the plurality of eigenpaths is maintained or collapsed based on information indicating quality of a channel between the transmission apparatus and the reception apparatus; and performing predetermined control of the transmission apparatus at transmission based on a result of determination, wherein performing predetermined control of the transmission apparatus comprising performing control according to a first control scheme based on water filling principle if the orthogonality is maintained as a result of determination by the determination unit, or performing the predetermined control according to a second control scheme different from the first control scheme if the orthogonality is collapsed, and wherein the second control scheme is to change a ratio of control based on the water filling principle to non-control, based on a collapsing degree of the orthogonality and the reception scheme of the reception apparatus.

8. A wireless communication method of a wireless communication system for performing wireless communication via a plurality of eigenpaths between a transmission apparatus and a reception apparatus, comprising the steps of:

estimating a reception scheme of the reception apparatus based on information indicating quality of a channel of each of the eigenpaths;

determining whether orthogonality of the plurality of eigenpaths is maintained or collapsed based on information indicating quality of a channel between the transmission apparatus and the reception apparatus; and performing predetermined control of the transmission apparatus at transmission based on the estimated reception scheme of the reception apparatus and a result of the determination, wherein performing predetermined control of the transmission apparatus comprising performing control according to a first control scheme based on water filling principle if the orthogonality is maintained as a result of determination by the determination unit, or performing the predetermined control according to a second control scheme different from the first control scheme if the orthogonality is collapsed, and wherein the second control scheme is to change a ratio of control based on the water filling principle to non-control, based on a collapsing degree of the orthogonality and the reception scheme of the reception apparatus.

* * * * *